(31.)

JOSEPH PAILCA.

Improvement in Tire Setters.

No. 122,778.

Patented Jan. 16, 1872.

122,778

UNITED STATES PATENT OFFICE.

JOSEPH PAILCA, OF LEDYARD, NEW YORK.

IMPROVEMENT IN TIRE-SETTERS.

Specification forming part of Letters Patent No. 122,778, dated January 16, 1872.

Specification describing a new and Improved Tire-Setting Apparatus, invented by JOSEPH PAILCA, of Ledyard, in the county of Cayuga and State of New York.

My invention consists of a bench, whereon the wheel is laid, with the tire adjusted upon its face at one side, and held by a holder suitably adapted therefor, while the other side of the wheel, on which the tire is to be forced, rests against a curved bar at the end of the frame, and a lever with a hook engaging the upper edge of the tire, while the end takes under the frame, which contracts the wheel and stretches the tire down upon the face of the hub in such manner as to allow of setting the tire without heating it all, as hereinafter more fully described.

Figure 1:
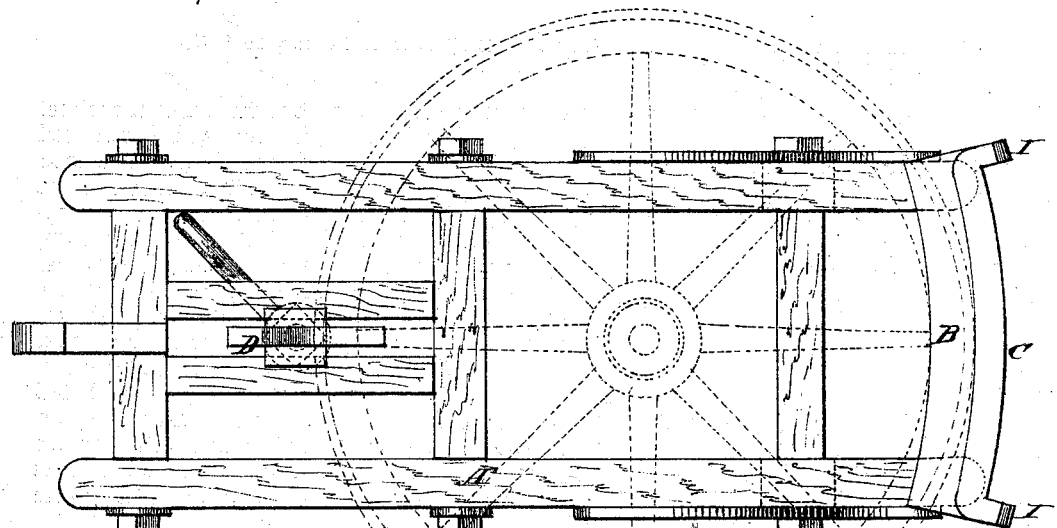
Figure 1:
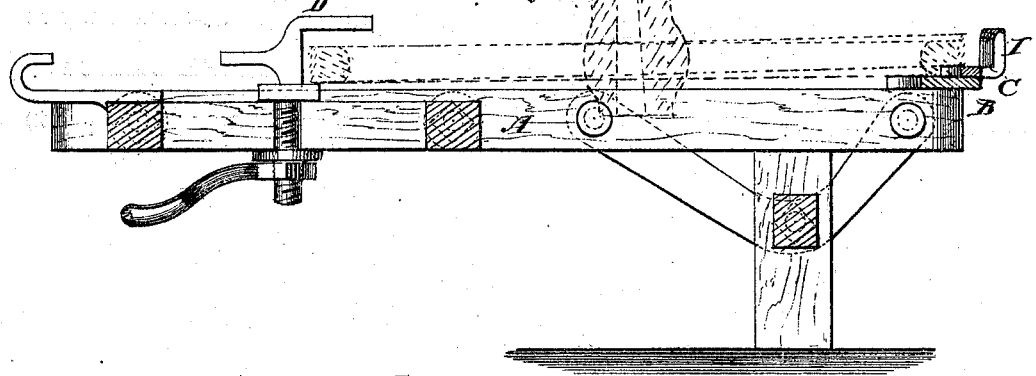
Figure 1:
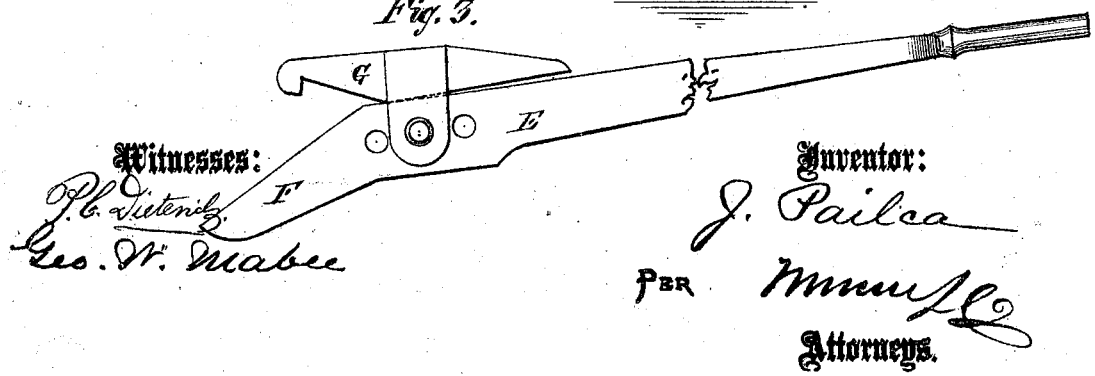

Figure 1 is a plan view of the frame, with the wheel and tire shown in dotted lines. Fig. 2 is a longitudinal sectional elevation; and Fig. 3 is a side elevation of the lever used for forcing the tire on the wheel.

Similar letters of reference indicate corresponding parts.

A is a strong frame, with a curved bar, B, at one end, on which the rim of the wheel lies while being held, as shown, at the opposite side by a holder, D, adjustable for wheels of different sizes; and upon plate B is another one, C, against which the face of the rim of the wheel bears. E is a lever with a bent end, F, adapted to take under the bars B and C, while the hook G on the upper side of said lever engages the top of the tire, the said tire resting on the upper side of the wheel at that side, as shown, while being on the face of the rim of the wheel on the other side under the holder. The parts being so adjusted, and the lever being pulled down, the rim of the wheel will be contracted against the curved bar C, so that the tire will be easily forced down to its place or as far as the bar C will let it go. Then, by placing the wheel-rim on top of plate C against the lugs I, the tire can be forced completely down. The hook G is made adjustable on the lever E to suit wheels and tires of different sizes.

Having thus described my invention, I claim as new and desire to secure by Letters Patent—

1. The combination of the hooked lever E with the bench A, having a holder, D, and curved bars B C, substantially as specified.

2. The combination of the adjustable holder D, bars B C, and bench A, substantially as specified.

JOSEPH PAILCA.

Witnesses:
SIDNEY MOSHER,
JONATHAN P. PROUD. (31)